(12) United States Patent
Adam

(10) Patent No.: US 6,376,061 B1
(45) Date of Patent: Apr. 23, 2002

(54) COMPOSITE MULTILAYER MATERIAL

(75) Inventor: Achim Adam, Nauheim (DE)

(73) Assignee: Federal-Mogul Wiesbaden GmbH, Wiesbaden (DE)

(*) Notice: Subject to any disclaimer, the term of this patent is extended or adjusted under 35 U.S.C. 154(b) by 0 days.

(21) Appl. No.: 09/258,624

(22) Filed: Feb. 26, 1999

(30) Foreign Application Priority Data

Feb. 28, 1998 (DE) .......................... 198 08 541

(51) Int. Cl.$^7$ .......................... B32B 15/08; B32B 27/18; B32B 27/20; B32B 27/28
(52) U.S. Cl. ................. 428/327; 128/305.5; 128/306.6; 128/328; 128/421; 128/422; 128/427; 128/463; 508/104; 508/105; 508/106; 508/108; 508/109
(58) Field of Search .......................... 428/304.4, 305.5, 428/306.6, 323, 327, 328, 329, 330, 331, 421, 422, 457, 463; 508/103, 104, 105, 106, 108, 109

(56) References Cited

U.S. PATENT DOCUMENTS 4,976,880 A * 12/1990 Satoji .......................... 252/12

FOREIGN PATENT DOCUMENTS

| DE | 42 27 909 C2 | | 2/1994 |
|---|---|---|---|
| EP | 0183375 | | 6/1986 |
| GB | 2177099 A | | 1/1987 |
| GB | 2272029 A | | 5/1994 |
| GB | 2291879 A | | 2/1996 |
| JP | 52-024252 | * | 2/1977 |
| JP | 06-220321 A | * | 8/1994 |
| WO | WO95/02772 | | 1/1995 |
| WO | WO97/03299 | | 1/1997 |

* cited by examiner

Primary Examiner—Vivian Chen
(74) Attorney, Agent, or Firm—Reising, Ethington, Barnes, Kisselle, Learman & McCulloch, P.C.

(57) ABSTRACT

A composite multilayer material is described which exhibits relatively high wear and delamination resistance without impairment of the coefficient of friction in the presence of oil. The composite multilayer material contains at least one powder-form polyaramid in its overlay, the content of PTFE or of PTFE together with the other fluorothermoplastics which form the matrix material amounting to 55–90 vol. %, the content of further fillers amounting to 9.5–44.5 vol. % and the content of polyaramid amounting to 0.5–10 vol. %.

10 Claims, No Drawings

COMPOSITE MULTILAYER MATERIAL

BACKGROUND OF THE INVENTION

1. Field of the Invention

The invention relates to a composite multilayer material comprising a metallic backing layer, a porous intermediate layer and an overlay applied thereto of PTFE or PTFE combined with other fluorothermoplastics, whose melting point is over 260° C. and into which fillers are incorporated.

2. Description of Related Art

Although materials of this type may also be used without difficulty where no lubrication is present, the composite multilayer material according to the invention is particularly suitable for bearings using oil for which a very low coefficient of friction with simultaneous high wear and cavitation resistance is of great importance, such as in shock-absorbers for example, which are used in the automobile industry, or in gear pumps or hydraulic motors. Owing to the coefficients of friction required, such materials have, on the basis of current knowledge, to consist to a great extent of PTFE, since no other known plastics fulfill these requirements, even if suitable in their other characteristics.

Since PTFE is too soft when used alone, and therefore exhibits a high coefficient of wear, materials have to be mixed with it which counteract cavitation and wear without substantially increasing the coefficient of friction.

The bearing materials used most frequently in the above-mentioned field of application comprise a steel backing, a porous bronze layer and a plastics material, of which 80 vol. % is PTFE and the rest is lead or molybdenum sulphide. The plastics material is pressed into the bronze framework and forms a thin closed layer thereover. However, under extreme conditions, such as arise, for example, in shock-absorbers owing to high loads, high sliding speeds and acceleration rates and high flow speeds in the bearing gap, materials exhibiting this structure have a tendency to produce erosion and cavitation phenomena and therefore have only a limited service life, particularly under high levels of stress.

Although it is possible to produce materials which exhibit virtually no wear and absolutely no susceptibility to cavitation under the above-described conditions if a different thermoplastic material such as PVDF or PEEK for example is used instead of PTFE, a marked increase in friction has to be tolerated in such cases where oil lubrication is used.

Many documents propose PTFE-based compositions, but thus far these have represented only relatively slight improvements in relation to the above-mentioned standard materials and in most cases exhibit an increased coefficient of friction, such as in the case of calcium fluoride, disclosed in EP 0 183 375, or polyimides, which are proposed in DE 42 27 909 C2.

In GB 2272029 A, increased cavitation resistance is put down to the particularly large specific surface area of the lead powder used. However, the use of lead or lead compounds is regarded increasingly critically by the users of sliding elements and therefore does not constitute a wholly satisfactory solution.

Although the possibility of using poly-(p-phenylene-terephthalamide) as a filler in self-lubricating PTFE-based bearing materials is often mentioned, it is used without exception in the form of fibres, such as in GB 2291879 A for example.

WO 95/02772 describes a special type of fibrillated fibre, which is incorporated into the PTFE matrix. The fibrous form causes problems with homogeneous incorporation into the PTFE matrix and necessitates corresponding special production devices. Moreover, such fibres exhibit the disadvantage that they contain inhalable particles and are suspected of being carcinogenic.

The fibres are incorporated into the matrix in the manner of irregular wickerwork and so reduce shattering and erosion of the otherwise soft PTFE matrix.

References to aramid fibres repeatedly occur, e.g. in WO 97/03299 or GB 2177099 A, as a neutral element in fibrous form which may be replaced by other fibres and is therefore clearly not essential to the achievement of any particular characteristic.

A fundamental reason for the suitability and use of such fibres is their exceptional mechanical characteristic values—very high tensile strength and modulus of elasticity—which find their basis in the particularly high degree of molecular orientation in the longitudinal direction of the fibres and the strong physical parallel linkage of the individual rigid molecular strands.

SUMMARY OF THE INVENTION

The object of the invention is to provide a composite multilayer material which exhibits relatively high wear and delamination resistance without modification of the production process and without impairment of the coefficient of friction in the presence of oil.

This object is achieved with a composite multilayer material in which the overlay contains at least one powder-form polyaramid and in which the content of PTFE or of PTFE together with the other fluorothermoplastics amounts to 55–90 vol. %, the content of further fillers amounts to 9.5–44.5 vol. % and the content of polyaramid amounts to 0.5–10 vol. %.

DETAILED DESCRIPTION OF THE PREFERRED EMBODIMENT

It has surprisingly been found that the addition of these comparatively small amounts of polyaramid powder is sufficient markedly to reduce shattering of the overlay surface, caused by erosion and cavitation phenomena, in relation to the corresponding additive-free compositions. When used in the absence of lubricants, the composite multilayer materials are not improved at all or are improved only insignificantly.

The content of PTFE or of PTFE together with the other fluorothermoplastics amounts advantageously to 65–80 vol. %, the content of further fillers to 10–34 vol. % and the content of polyaramid to 2–10 vol. %.

The polyaramids are preferably poly-(p-phenylene-terephthalamide) (PPTA) and/or poly-(p-benzamide) (PBA), which exhibit high molecular rigidity.

The particle size of the polyaramid powder is preferably below 100 $\mu$m. The particle size of the polyaramid powder is advantageously <50 $\mu$m.

Particularly suitable other fillers are lead, lead oxide, layer structure metal sulphides such as molybdenum sulphide, metal fluorides, boron nitride, graphite, carbon black, coke and iron oxide, which may be used individually or in combination.

In addition to the above-mentioned fillers, fillers may also be used from one or more of the groups comprising hard materials, pigments, fibrous materials, solid lubricants, thermosets or high temperature thermoplastics.

A preferred filler combination consists of layer structure metal sulphides, hexagonal boron nitride and iron(III) oxide.

If $Fe_2O_3$ is contained in combination with another filler, the content preferably amounts to 1–6 vol. %.

If, in addition to PTFE, other fluorothermoplastics are used as the matrix material, PFA, FEP, ETFE or EPE are advantageously suitable. The content thereof may be at most equal to that of PTFE.

A preferred use of the composite multilayer material is for sliding elements for use in shock-absorbers or other hydraulic applications.

By way of example, possible embodiments are compared with corresponding materials lacking the addition of poly-(p-phenyleneterephthalamide) powder or poly-(p-benzamide) powder. The compositions are listed in Table 1.

| Example No. | Composition in Vol. % |
|---|---|
| 1 | PTFE 80 $MoS_2$ 15 PPTA 5 |
| 2 | PTFE 80 $MoS_2$ 20 |
| 3 | PTFE 80 graphite 15 PPTA 5 |
| 4 | PTFE 80 graphite 20 |
| 5 | PTFE 80 BN 6.75 $MoS_2$ 6.75 $Fe_2O_3$ 1.5 PPTA 5 |
| 6 | PTFE 80 BN 9 $MoS_2$ 9 $Fe_2O_3$ 2 |
| 7 | PTFE 80 $MoS_2$ 15 PBA 5 |

The materials may be produced in the known way:
preparation of a homogeneous suspension of the fillers and polyaramid powder in water with the aid of a non-ionic wetting agent;
addition of a 30% PTFE dispersion and homogeneous mixing;
coagulation of the mixture with the aid of aluminium nitrate solution;
removal of excess water and stirring until the correct consistency of the composition for coating is obtained;
rolling of the mixture into the porous bronze framework applied to steel;
sintering of the PTFE at 380° C.;
hot compaction of the entire structure by rolling.

Bushes of these materials were subjected to a shock-absorber test and then examined for wear. The test programme lasted 30 hours and was based on a ramp function with 80 mm lift and a frequency of 0.5 Hz. In addition, the coefficients of friction of the materials when lubricated by drip feed, subjected to 1000 N loading and operating at a sliding speed of 20 mm/s were measured.

The data are set out in Table 2. In Examples 1–6 comparable materials, in each case with and without the addition of polyaramid powder, are compared. Example 7 shows that polymer materials which are similar in structure to PPTA are also capable of bringing about the effect according to the invention.

TABLE 2

| Example No. | Wear [μm] | Coefficient of Friction, oiled |
|---|---|---|
| 1 | 15 | 0.028 |
| 2 | 42 | 0.019 |
| 3 | 33 | 0.040 |
| 4 | 80 | 0.034 |
| 5 | 7 | 0.025 |
| 6 | 24 | 0.016 |
| 7 | 18 | 0.026 |

These results show clearly the positive influence of the polyaramid powder on wear resistance and are evidence that the coefficient of friction is only slightly impaired.

Obviously, many modifications and variations of the present invention are possible in light of the above teachings. It is therefore to be understood that, within the scope of the appended claims, the invention may be practiced otherwise than as specifically described.

What is claimed is:

1. A composite multilayer material comprising a metallic backing layer, a porous intermediate layer and an overlay applied thereto, said overlay having a fluorothermoplastic matrix consisting of fluorothermoplastic material having a melting point above 260° C., said fluorothermoplastic matrix material comprising PTFE present in an amount no less than any other fluorothermoplastic constituent of the fluorothermoplastic matrix and fillers incorporated into said fluorothermoplastic matrix, characterized by said overlay having incorporated therein at least one powder-form polyaramid and wherein the content of said fluorothermoplastic matrix material amounts to 55–90 vol. %, the content of said fillers amounts to 9.5–44.5 vol. % and the content of said polyaramid amounts to 0.5–10 vol. %.

2. The composite multilayer material of claim 1 wherein the content of said matrix material amounts to 65–80 vol. %, the content of said fillers amounts to 10–34 vol. % and the content of said polyaramid amounts to 2–10 vol. %.

3. The composite multilayer material of claim 1 wherein said polyaramid comprises at least one material selected from the group consisting of poly-(p-phenyleneterephthalamide) and poly-(p-benzamide).

4. The composite multilayer material of claim 1 wherein said polyaramid powder has a particle size <100 μm.

5. The composite multilayer material of claim 4 wherein said particle size of said polyaramid powder is <50 μm.

6. The composite multilayer material of claim 1 wherein said matrix material includes other fluorothermoplastics in addition to said PTFE whose melting points are above 260° C. comprising at least one material selected from the group consisting of PFA, FEP, and EPE, and the content of said fluorothermoplastics materials is at most equal to that of said PTE.

7. The composite multilayer material of claim 6 wherein said fillers include at least one material selected from a first group consisting of lead, lead oxide, layer structure metal sulphides, molybdenum sulphide, metal fluorides, boron nitride, grapite, carbon black, coke and iron oxide.

8. The composite multilayer material of claim 7 wherein said fillers further include at least one material selected from a second group consisting of pigments, fibrous materials, solid lubricants, thermosets and thermoplastics.

9. The composite multilayer material of claim 7 wherein said iron oxide filler comprises 1–6 vol. % $Fe_2O_3$.

10. The composite multilayer material of claim 7 wherein said fillers comprise a mixture of layer structure metal sulphides, boron nitride and $Fe_2O_3$.

* * * * *

UNITED STATES PATENT AND TRADEMARK OFFICE
CERTIFICATE OF CORRECTION

PATENT NO. : 6,376,061 B1
DATED : April 23, 2002
INVENTOR(S) : Achim Adam

It is certified that error appears in the above-identified patent and that said Letters Patent is hereby corrected as shown below:

Column 4,
Line 41, after "FEP" insert -- ETFE --,
Line 43, change "PTE" to -- PTFE --.

Signed and Sealed this

Fifth Day of November, 2002

Attest:

JAMES E. ROGAN
Attesting Officer    Director of the United States Patent and Trademark Office